United States Patent
Shoemaker, Jr.

(10) Patent No.: US 11,470,835 B1
(45) Date of Patent: Oct. 18, 2022

(54) HUMANE ENVIRONMENTAL MOUSE TRAP

(71) Applicant: Stephen P. Shoemaker Trust, Manhattan Beach, CA (US)

(72) Inventor: Stephen P. Shoemaker, Jr., Redondo Beach, CA (US)

(73) Assignee: Stephen P. Shoemaker Trust, Manhattan Beach, CA (US)

( * ) Notice: Subject to any disclaimer, the term of this patent is extended or adjusted under 35 U.S.C. 154(b) by 0 days.

(21) Appl. No.: 17/701,648

(22) Filed: Mar. 22, 2022

(51) Int. Cl.
*A01M 23/08* (2006.01)
*A01M 23/16* (2006.01)

(52) U.S. Cl.
CPC ............ *A01M 23/08* (2013.01); *A01M 23/16* (2013.01)

(58) Field of Classification Search
CPC ...... A01M 23/00; A01M 23/02; A01M 23/08; A01M 23/14; A01M 23/16; A01M 23/18; A01M 23/20
See application file for complete search history.

(56) References Cited

U.S. PATENT DOCUMENTS

| | | | | |
|---|---|---|---|---|
| 2,434,031 A * | 1/1948 | Adams | A01M 23/18 | 43/61 |
| 2,813,369 A * | 11/1957 | Thomisee | A01M 23/18 | 43/61 |
| 3,177,608 A * | 4/1965 | Lindelow | A01M 23/18 | 43/61 |
| 3,940,876 A * | 3/1976 | Zaccaira | A01M 23/08 | 43/131 |
| 3,992,802 A * | 11/1976 | La Rue | A01M 23/20 | 43/61 |
| 4,418,493 A * | 12/1983 | Jordan | A01M 23/18 | 43/67 |
| 4,653,221 A * | 3/1987 | Pratscher | A01M 23/14 | 43/79 |
| 5,040,326 A * | 8/1991 | Van Dijnsen | G08B 13/18 | 43/65 |
| 5,327,673 A * | 7/1994 | Paglia | A01M 23/18 | 43/61 |
| 5,953,853 A * | 9/1999 | Kim | A01M 23/38 | 43/61 |
| 6,865,843 B1 * | 3/2005 | Jordan, Sr. | A01M 23/12 | 43/60 |
| 8,695,274 B2 * | 4/2014 | Gauker | A01M 25/00 | 43/67 |
| 2005/0097808 A1 * | 5/2005 | Vorhies | A01M 23/20 | 43/61 |
| 2011/0078940 A1 * | 4/2011 | Gauker | A01M 25/00 | 43/61 |

* cited by examiner

*Primary Examiner* — Darren W Ark
*Assistant Examiner* — Katelyn T Truong

(57) ABSTRACT

A mouse trap is disclosed comprising a jar that is attached to a housing and includes a plastic bag inside. The housing and jar include a mouse entrance that leads inside the plastic bag, which is intended to include some bait at a distal end to lure the mouse into the jar. The trap includes a pressure or motion detector that senses when a mouse has entered the jar. The trap includes a solenoid that triggers a spring loaded hollow rod to close the jar when the mouse enters, and actuates a vacuum that removes the air from the plastic bag with the mouse inside. The removal of oxygen from the bag causes the mouse to lose consciousness, and eventually suffocate in its sleep. Once the mouse is dead, the bag can be removed and replaced.

6 Claims, 4 Drawing Sheets

HUMANE ENVIRONMENTAL MOUSE TRAP

BACKGROUND

It has been said that if you build a better mouse trap, the world will beat a path to your door. Maybe because of this, many have tried to improve on the traditional mouse trap device. The problem with many mouse traps are that they are messy, violent, and torture or mortally wound the animal and/or use poisons, and require contact and/or clean up after completing the task. Few people want to deal with extracting the corpse, disposing of it, and cleaning the eventual mess that occurs. What is needed is a mouse trap that is clean, efficient, humane, poison-free, and does not require contact with the animal after death. The present invention addresses these needs.

SUMMARY OF THE INVENTION

The present invention is a mouse trap comprising a bottle or jar that can be screwed onto a trap housing to form an airtight seal. The trap includes a large hole in the jar's lid or cap through which a mouse can enter, and a plastic bag is placed inside the jar. Bait is placed in the plastic bag to lure the mouse inside. The plastic bag is placed inside the jar and the trap is provided with a pressure detector, motion detector or switch that senses when a mouse has entered the jar. The trap includes a solenoid that releases a hollow rod and suction cup to occlude the hole where the mouse entered, such that the suction cup forms a seal with the jar and the plastic bag while trapping the mouse in the plastic bag. The vacuum may come from a passage through the rod or directly through the bottle cap. The detector signals a controller to actuate a vacuum pump to remove the air from the plastic bag with the mouse inside. The removal of air from the bag causes the mouse to lose consciousness, and eventually suffocate in its sleep. The mouse does not suffer and there is no mess associated with the operation of the device. Once the mouse is dead, the vacuum is turned off, the jar is unscrewed and the mouse and bag are removed. The bag can be dropped into a waste can for disposal without the need to touch the rodent. The device is simple, efficient, reusable, and provides a humane way to eliminate the animal.

Alternately, the vacuum can be turned off and the trap is used as a non-kill catch and release device where the mouse can be released alive at another location.

DETAILED DESCRIPTION OF THE PREFERRED EMBODIMENTS

Figure 1:
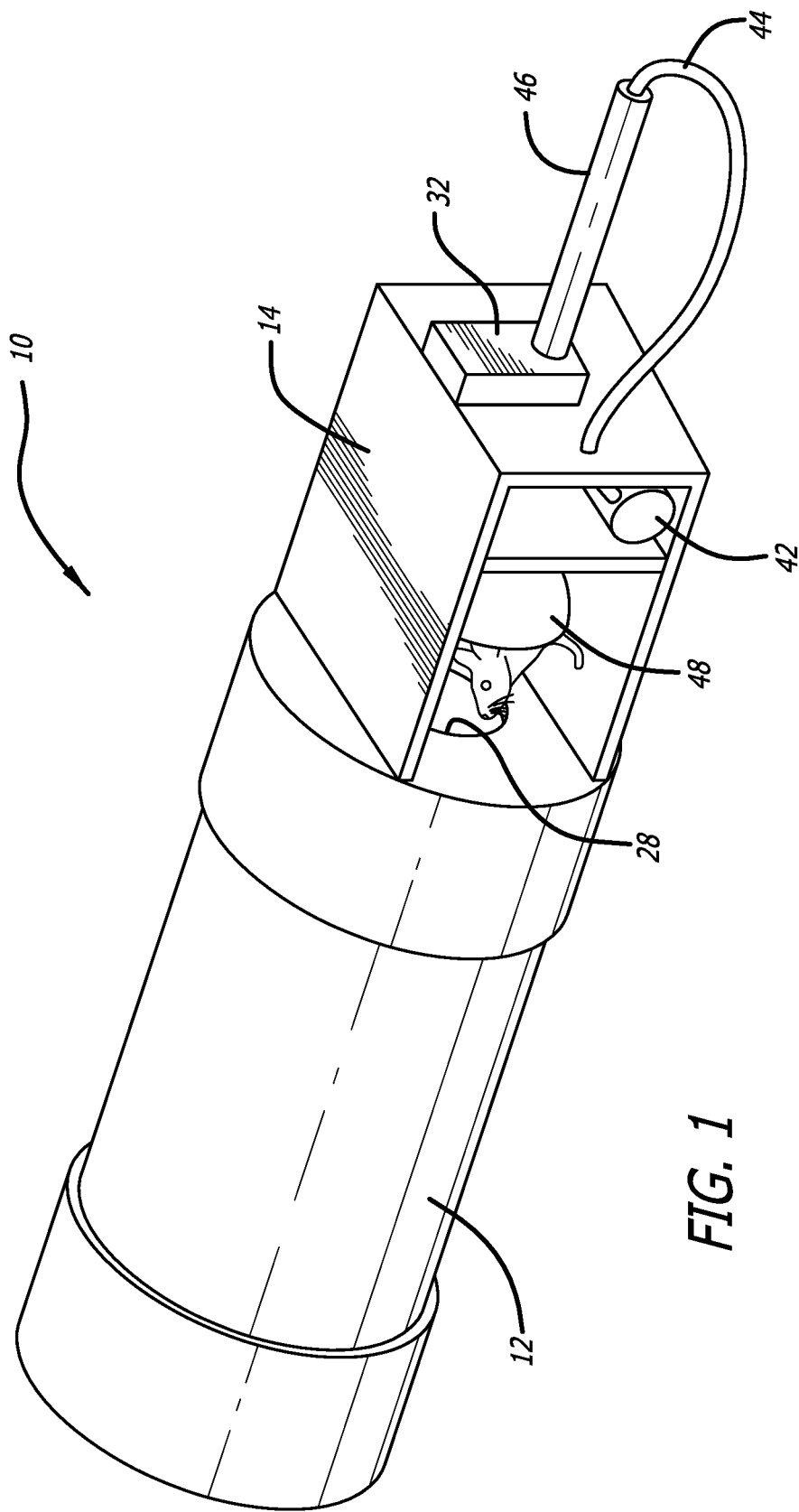
FIG. 1 is an elevated, perspective view of a first preferred embodiment of the present invention.
Figure 2:
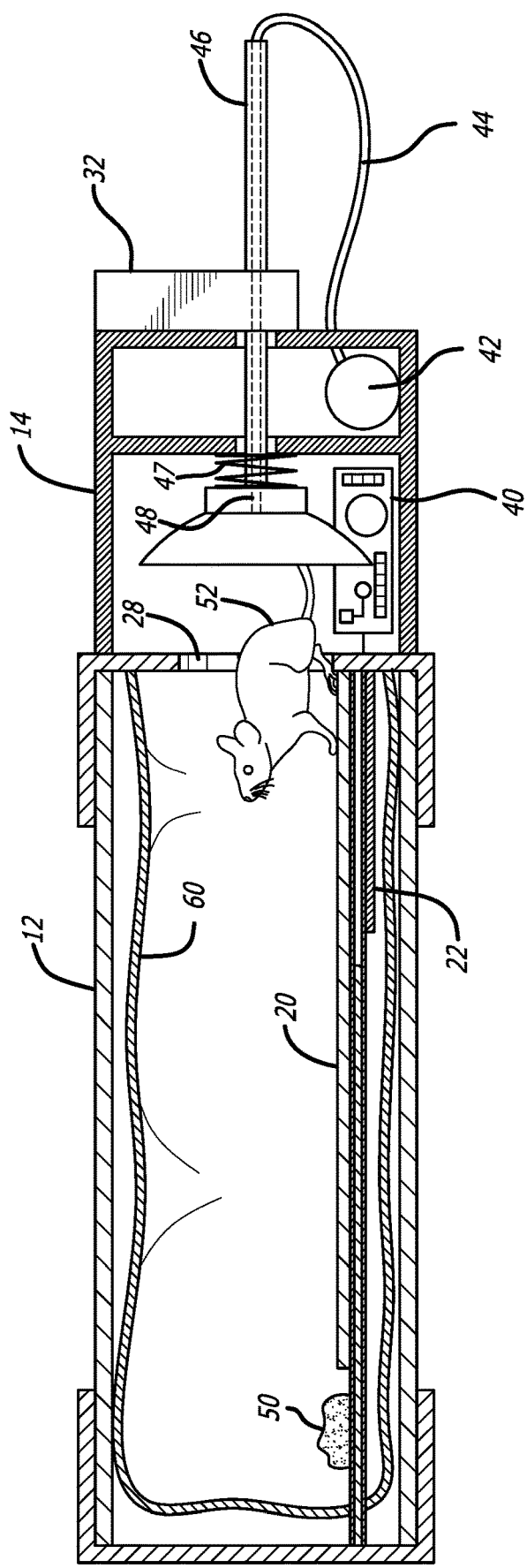
FIG. 2 is a cross sectional side view of the embodiment of FIG. 1.
Figure 3:
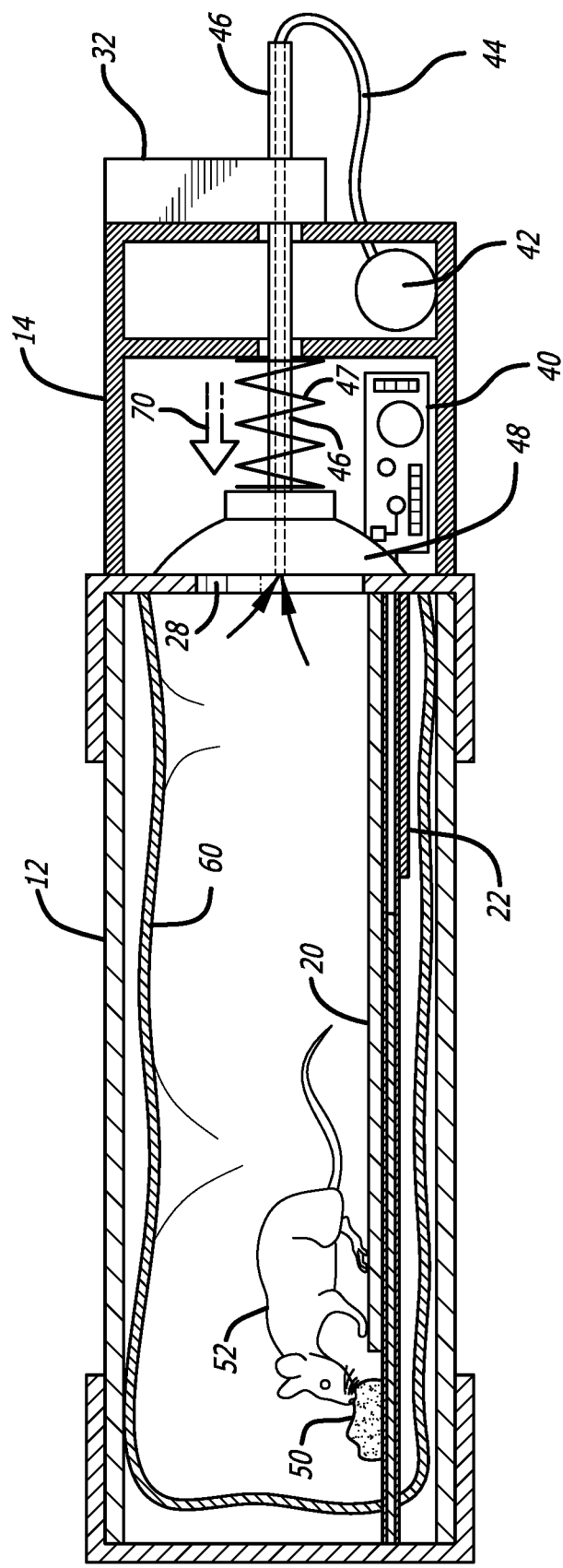
FIG. 3 is a second cross sectional side view of the embodiment of FIG. 1.

FIGS. 1-4 correspond to a first embodiment of the present invention in the form of a portable, mousetrap 10 that can be battery operated or plugged into a wall outlet to capture a rodent. The mousetrap 10 comprises a jar 12 extending from a box-like housing 14 that is open, allowing the mouse to enter on one side. A bag 60 (FIG. 3) is inserted into the jar 12 and the jar 12 is connected by a portal 28, such as a hole in the jar's lid or the mouth of the jar, that forms a path for a rodent to enter the jar 12 via the portal 28 into the bag 60. The bag is attached at a hole such that the vacuum is applied in the bag rather than the jar. The interior of the jar 12 may support a platform 20, and below or adjacent the platform 20 is a sensor, such as a pressure sensor 22, that can detect when the presence of a mouse inside the jar 12. The sensor 22 is connected to a controller 40. The controller 40 controls the various functions and components of the mousetrap 10. While the preferred embodiment shows a pressure sensor 22 other sensors may be used to detect the presence of a mouse, such as an optical sensor, a motion sensor, or the like. The jar 12 may be attached to the housing 14 in various ways, such as a threaded connection or a snap-fit coupling, as long as the connection is substantially air tight when the jar 12 is inserted into or attached to the housing 14.

The housing 14 includes a vacuum pump 42 that includes a tube 44 to withdraw air. The tube 44 connects to one end of a hollow rod 46 that is spring-loaded by spring 47 to slide horizontally when released by a solenoid 32. The opposite end of the hollow rod 46 has a suction cup 48 with a diameter D that is larger than the diameter of the portal 28, e.g. if the jar 12 has a cap, the hole in the cap that connects the jar 12 and the housing 14. The solenoid 32 releases the rod and the spring pushes the rod and the suction cup 48 against the opening, trapping the mouse inside the bag and jar. Because the rod 46 is hollow, the inside of the jar and the plastic bag is connected to the opposite end of the rod 46. This opposite end of the rod 46 attaches to a tube 44 that in turn is attached to the vacuum pump 42, such that the vacuum pump 42 can remove air inside the plastic bag while the jar is sealed by the suction cup 48.

The operation of the mousetrap 10 will now be described. The mousetrap 10 is placed in an area known to be frequented by vermin. A quantity of bait 50 is placed in the bag 60, which is placed in the jar 12. The spring loaded rod 46 with the suction cup on one end is retracted so that the portal 28 is not occluded, allowing a mouse 52 to enter the jar 12 and bag 60 in search of the bait 50. When the mouse 52 enters the jar and moves into the bag 60, the sensor detects the presence of the mouse and sends a signal to the controller 40 to actuate the solenoid 32. The solenoid 32 then releases the rod 46, allowing the spring 47 to push the rod horizontally in the direction of arrow 70 until the suction cup 48 presses against the portal 28 and seals the portal with the mouse inside. In this position, the suction cup 48 completely surrounds the portal 28 and blocks the escape of the mouse 52. Once the suction cup 48 has closed the portal 28, the controller 40 sends a signal to the vacuum pump 42 to actuate. The actuation of the vacuum pump 42 draws air from the bag 60, through the suction cup 48, through the hollow rod 46, and through the tube 44, creating a negative pressure inside the bag, causing the bag to collapse around the mouse and remove the air inside the bag 60. Alternately, the vacuum pump can remove air from the bag more directly via a suction tube (not shown). The vacuum pump 42 removes the air from the bag until the mouse loses consciousness, and then suffocates in its sleep. The controller 40 may after a period cause the vacuum pump 42 to turn off, and may send a signal or alert via a transmitter to a user to come and check the trap 10. Alternatively, the controller can illuminate a light or sound an alarm to indicate an extermination has occurred.

Once the extermination has occurred, the user can remove the bag 60 from the jar 12 and dump the corpse into a trash receptacle without the need to touch the mouse. There is no blood, no clean-up, and the unit can be used over and over again simply by resetting the trap and replacing the bag and bait. The trap can be placed anywhere and poses no threat to pets or children. There is no poison, no springs-actuated strikers, and no adhesive. The invention is reliable, cost effective, and can be made of different sizes depending on the animal to be captured.

Figure 4:
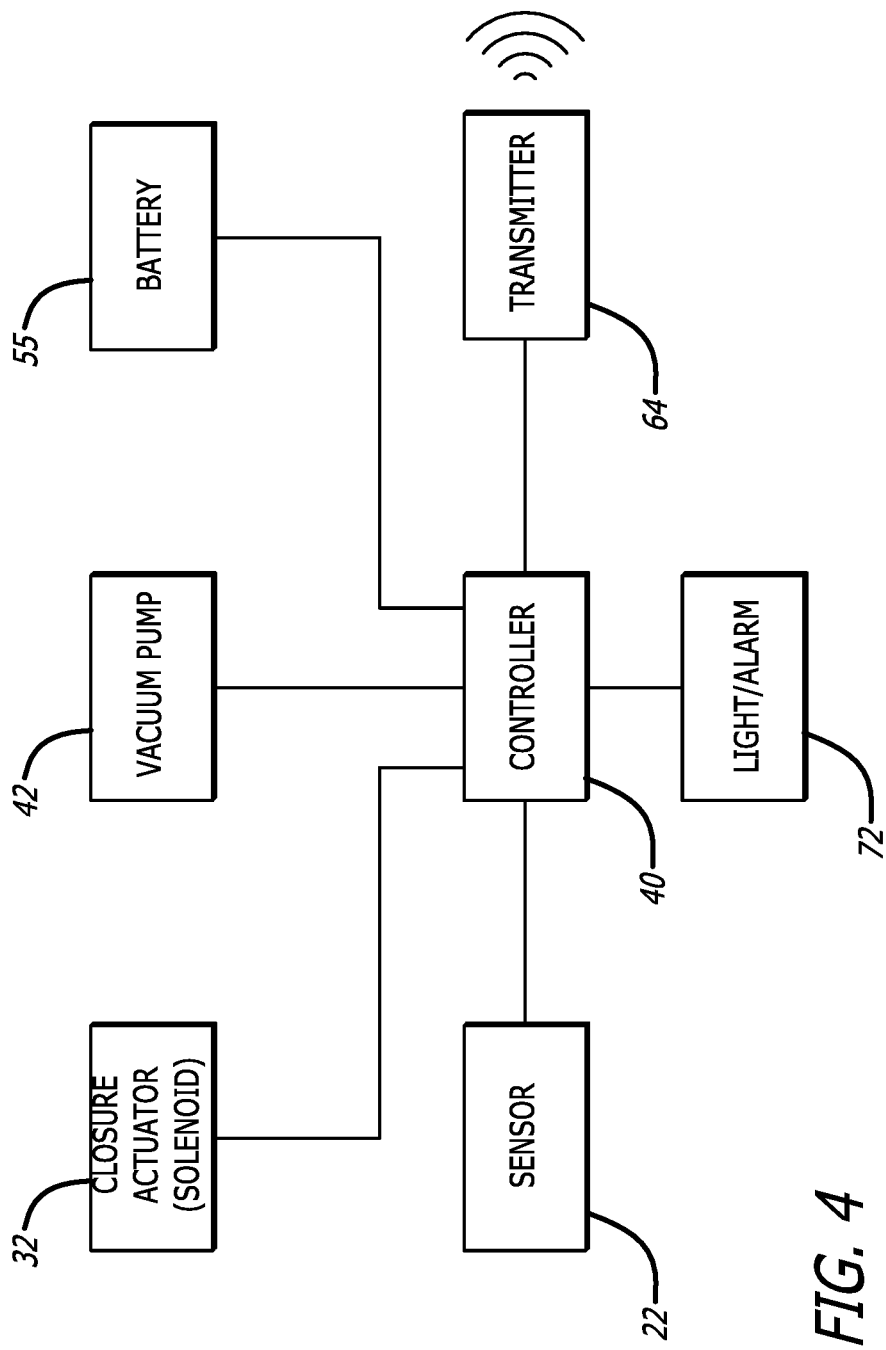
FIG. 4 is a schematic of the elements of the embodiment of FIG. 1.

FIG. 4 is a schematic diagram that illustrates various components of the system. The controller 40 manages the various electrical components, including receiving signals from the mouse sensor 22 (pressure, optical, etc.) and actuates the solenoid 32, and the vacuum pump 42. The system can be powered by a portable power supply such as battery 55, and include a transmitter 64 to signal to a remote user that the trap has captured its prey. The controller 40 can also illuminate a light or activate an alarm 72 to alert a local user that the trap has been activated.

While the foregoing describes some of the inventor's preferred embodiments, the invention is not intended to be limited by any specific embodiment described or depicted in the figures. Rather, the invention's scope is determined by the appended claims using their ordinary meanings consistent with the foregoing descriptions and depictions herein.

I claim:

1. A mousetrap, comprising:
   a jar having an entrance hole and defining an interior space;
   a housing enclosing a vacuum pump that is fluidly connected to the interior space;
   a sensor inside the housing to detect a presence of a mouse;
   a controller in communication with the sensor;
   a suction cup for occluding the entrance hole of the jar;
   a solenoid managed by the controller, said solenoid translating the suction cup for occluding the entrance hole;
   a power supply; and
   a tube connecting the vacuum pump to the suction cup;
   whereupon the controller actuates the vacuum pump when the controller receives a signal from the sensor that a mouse is detected after the solenoid translates the suction cup into engagement with the entrance hole, and wherein the tube is configured to remove air from the interior space through the suction cup.

2. The mousetrap of claim 1, further comprising a plastic bag within the jar and fluidly connected to the vacuum pump.

3. The mousetrap of claim 2, wherein the sensor is a pressure sensor.

4. The mousetrap of claim 2, wherein the sensor is a motion sensor.

5. The mousetrap of claim 1, further comprising an alarm to alert a user when a mouse is captured.

6. The mousetrap of claim 1, further comprising a transmitter to send a signal to a remote user when a mouse is captured.

* * * * *